(12) United States Patent
Boyapalle et al.

(10) Patent No.: US 10,599,381 B2
(45) Date of Patent: Mar. 24, 2020

(54) COLLABORATION BETWEEN HEAD-MOUNTED DEVICES (HMDS) IN CO-LOCATED VIRTUAL, AUGMENTED, AND MIXED REALITY (XR) APPLICATIONS

(71) Applicant: Dell Products, L.P., Round Rock, TX (US)

(72) Inventors: Anantha K. Boyapalle, Cedar Park, TX (US); Vivek Viswanathan Iyer, Austin, TX (US); Philip M. Seibert, Austin, TX (US); Karthikeyan Krishnakumar, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 10 days.

(21) Appl. No.: 16/105,083

(22) Filed: Aug. 20, 2018

(65) Prior Publication Data
US 2020/0057592 A1    Feb. 20, 2020

(51) Int. Cl.
*G06F 3/147* (2006.01)
*G06T 19/00* (2011.01)

(52) U.S. Cl.
CPC ............ *G06F 3/147* (2013.01); *G06T 19/006* (2013.01); *G06T 2219/024* (2013.01)

(58) Field of Classification Search
CPC .......... G06F 3/147; G06F 3/013; G06F 1/163; G06F 3/1423; G06T 19/006; G06T 2219/024; H04N 13/246; G02B 27/017
See application file for complete search history.

(56) References Cited

U.S. PATENT DOCUMENTS

2017/0269713 A1* 9/2017 Marks .................... A63F 13/335
2019/0094981 A1* 3/2019 Bradski ................... G06F 3/012

OTHER PUBLICATIONS

Nvidia, Multi user virtual reality System, reference design Guide, May 2017 (Year: 2017).*

* cited by examiner

*Primary Examiner* — Robert J Michaud
(74) *Attorney, Agent, or Firm* — Fogarty LLP

(57) ABSTRACT

In a collaborative virtual, augmented, and mixed reality (xR) session, different users wearing head-mounted devices HMDs may leave the xR session and new HMD-wearing users may join. The HMD worn by the joining user may be calibrated based on the physical characteristics, such as ambient noise and interference, of physical environment in which the xR session is conducted. An HMD may generate a profile of the noise and interference in the environment that adversely affects the ability for the communicating directly via supported transmission mechanisms. The profile may be provided directly to the joining HMD, allowing the joining HMD to quickly calibrate the transmission mechanisms included in the received profile to the particular sources of noise and interference in the physical environment.

20 Claims, 5 Drawing Sheets

COLLABORATION BETWEEN HEAD-MOUNTED DEVICES (HMDS) IN CO-LOCATED VIRTUAL, AUGMENTED, AND MIXED REALITY (XR) APPLICATIONS

FIELD

The present disclosure generally relates to Information Handling Systems (IHSs), and, more particularly, to systems and methods for collaboration between Head-Mounted Devices (HMDs) in co-located virtual, augmented, and mixed reality (xR) applications hosted by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern applications, IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible via a display of an HMD that may be worn by a user in similar manner to a pair of goggles.

In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In some implementations, HMDs may be tethered to an external or host IHS. Most HMDs do not have as much processing capability as the host IHS, so the host IHS may be used to generate some or all of the digital images that are displayed by the HMD. The HMD transmits information to the host IHS regarding the state of the user, which in turn enables the host IHS to determine which image or frame to show to the user next, and from which perspective, as the user moves in space.

An HMD allows a single user to participate in an xR session that is provided by a host IHS coupled to the HMD. In addition, HMDs may also allow multiple users to collaborate within a shared xR session. In certain of such scenarios, one or more of these users participating within an xR session may be located within the same room, such as a conference room or other meeting area. During an xR session, some users may leave the xR session and other users may join the ongoing xR session. Each of the users that participate in a co-located, collaborative xR session may utilized a different variety of HMD with different operational capabilities.

SUMMARY

In various embodiments, a first HMD may be configured for participating in a co-located xR session in a first physical environment. The first HMD may include: a processor; a plurality of sensors, each sensor associated with one or more transmission mechanisms for participating in the co-located xR session; and a memory coupled to the processor, the memory having program instructions stored thereon that, upon execution, cause the first HMD to: determine, via the plurality of sensors, a signal integrity within the first physical environment for the transmission mechanisms available for participating in the co-located xR session; generate an xR profile for the first physical environment based on the determined signal integrity for each transmission mechanisms; receive an indication of a second HMD seeking to join the co-located xR session; and transmit the xR profile to the second HMD for use in calibrating the second HMD for participating in the co-located xR session.

In certain additional embodiments of the first HMD, the signal integrity comprises a signal-to-noise ratio within the first physical environment for each of the transmission mechanisms. In certain additional embodiments, the program instructions further cause the first HMD to normalize the determined signal-to-noise ratios based on thresholds for use of the respective transmission mechanisms for an xR session within the first physical environment. In certain additional embodiments of the first HMD, the signal integrity of the transmission mechanisms available for participating in the co-located xR session is specified based on one or more rankings of the normalized signal-to-noise ratios for the transmission mechanisms available within the first physical environment. In certain additional embodiments of the first HMD, the xR profile for the first physical environment specifies a ranking of the transmission mechanisms available within the xR session for communicating directly with the first HMD. In certain additional embodiments of the first HMD, the xR profile for the first physical environment specifies a ranking of the transmission mechanisms available for participating in the xR session. In certain additional embodiments of the first HMD, signal integrity is determined by exchanging signal integrity test messages with devices participating in the xR session. In certain additional embodiments of the first HMD, the devices comprise a third HMD participating in the xR session.

In various additional embodiments, a first HMD may be configured for participating in a co-located xR session in a first physical environment. The first HMD may include a processor; a plurality of sensors, each sensor associated with a transmission mechanism for participating in the co-located xR session; and a memory coupled to the processor, the memory having program instructions stored thereon that, upon execution, cause the first HMD to: broadcast a discovery beacon signaling a request by the first HMD to join the co-located xR session; in response to the beacon, receive a plurality xR profiles for the first physical environment, wherein the xR profiles are transmitted by HMDs participating in the co-located xR session, and wherein the xR profile specifies a signal integrity of the transmission mechanisms available for participating in the co-located xR session in the first physical environment; select a first xR profile from the plurality of received xR profiles, wherein the first xR profile is generated by a second HMD of the HMDs participating the co-located xR session; and calibrate the plurality of sensors for participation in the co-located xR session based on the signal integrity of the transmission mechanisms specified in the first xR profile.

In certain additional embodiments of the additional first HMD, the signal integrity specified in the first xR profile comprises a signal-to-noise ratio within the first physical environment for each of the transmission mechanisms. In certain additional embodiments of the additional first HMD, the signal-to-noise ratio is determined by exchanging signal integrity test messages with devices participating in the xR session. In certain additional embodiments of the additional first HMD, the first xR profile is selected from the plurality of received xR profiles based on a proximity of the first HMD to the second HMD within the first physical environment. In certain additional embodiments of the additional first HMD, the first xR profile is selected from the plurality of received xR profiles based on a similarity between the first HMD and the second HMD. In certain additional embodiments of the additional first HMD, the first xR profile specifies a plurality of signal integrities for the transmission mechanisms, each signal integrity determined at a discrete location with the first physical environment.

In various embodiments, a method for participating in a co-located xR session in a first physical environment using a first HMD includes: determining via a plurality of sensors, each associated with one or more transmission mechanisms for participating in the co-located xR session, a signal integrity within the first physical environment for the transmission mechanisms; generating an xR profile for the first physical environment based on the determined signal integrity for each of the transmission mechanisms; receiving an indication of a second HMD seeking to join the co-located xR session; and transmitting the xR profile to the second HMD for use in calibrating the second HMD for participating in the co-located xR session.

In certain embodiments of the method, the signal integrity comprises a signal-to-noise ratio within the first physical environment for each of the transmission mechanisms. In certain embodiments, the method may further include: normalizing the determined signal-to-noise ratios based on thresholds for use of the respective transmission mechanisms for an xR session within the first physical environment; and generating one or more rankings of the normalized signal-to-noise ratios for the transmission mechanisms. In certain embodiments of the method, the xR profile for the first physical environment specifies a ranking of the transmission mechanisms available within the xR session for communicating directly with the first HMD. In certain embodiments of the method, the signal integrity is determined by exchanging signal integrity test messages with devices participating in the xR session. In certain embodiments of the method, the devices comprise a third HMD participating in the xR session.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for collaborating between Head-Mounted Devices (HMDs) in virtual, augmented, and mixed reality ("xR") applications in order to more quickly and efficiently join additional HMDs to an ongoing co-located xR session. These techniques are particularly useful in xR applications that employ HMDs, Heads-Up Displays (HUDs), and eyeglasses—collectively referred to as "HMDs."

Figure 1:
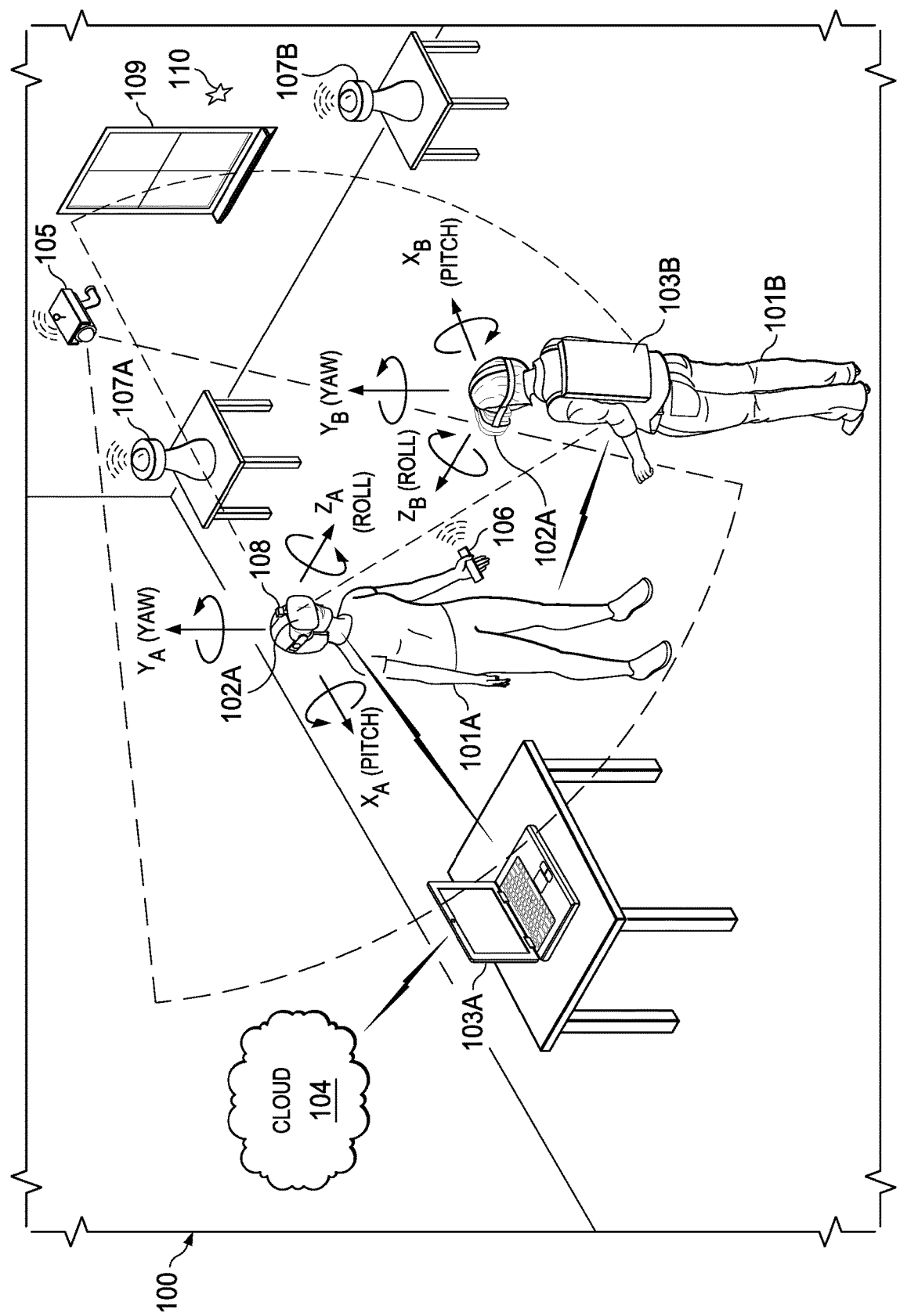
FIG. 1 is a perspective view of an example of an environment having co-located Head-Mounted Displays (HMDs), according to some embodiments.

FIG. 1 is a perspective view of an example of physical environment 100 having co-located HMDs 102A and 102B. As illustrated, user 101A wears HMD 102A around their head and over their eyes during execution of an xR application. Similarly, user 101B wears HMD 102B. In this non-limiting example, HMD 102A is tethered to host Information Handling System (IHS) 103A via a wireless connection, and HMD 102B is tethered by a wired connection to host IHS 103B that is worn by user 101B.

In co-located environment 100 hosting an xR session, the xR application(s) being executed may include a subset of components or objects operated by HMD 102A and another subset of components or objects operated by host IHS 103A; as well as a subset of components or objects operated by HMD 102B, and another subset of components or objects operated by host IHS 103B.

Particularly, host IHS 103A may be used to generate digital images to be displayed by HMD 102A. In turn, HMD 102A transmits information to host IHS 103A regarding the state of user 101A, such as physical position, pose or head orientation, gaze focus, etc., which enables host IHS 103A to determine which image or frame to display to the user next, and from which perspective. In a corresponding manner, IHS 103B may generate digital images to be displayed by HMD 102B based on the state of user 101B. In this example, host IHS 103B is built into (or otherwise coupled to) a backpack or vest, wearable by user 101B and host IHS 103A.

As user 101A moves about environment 100, changes in: (i) physical location (e.g., Euclidian or Cartesian coordinates x, y, and z) or translation; and/or (ii) orientation (e.g., pitch, yaw, and roll) or rotation, cause host IHS 103A to effect a corresponding change in the picture or symbols displayed to user 101A via HMD 102A, usually in the form of one or more rendered video frames. Similarly, as user 101B moves, changes in HMD 102B's physical location or translation; and/or HMD 102B's orientation or rotation, cause host IHS 103B to effect corresponding changes in the video frames displayed to user 101B via HMD 102B.

Movement of the user's head and gaze may be detected by HMD 102A and processed by host IHS 103A, for example, to render video frames that maintain visual congruence with the outside world and/or to allow user 101A to look around a consistent xR session. In some cases, xR application components executed by HMDs 102A-B and IHSs 103A-B may provide a cooperative, at least partially shared, xR session between users 101A and 101B, such as in the form of a video game, 3-D modeling and/or a productivity (e.g., a virtual meeting) application.

As used herein, the term "Simultaneous Localization and Mapping" or "SLAM" refers systems and methods that use positional tracking devices to construct a map of an unknown physical environment in which an HMD is located, and that simultaneously identifies where an HMD is located within the physical environment. SLAM methods may also identify other positional information regarding an HMD, such as an HMD's orientation and/or pose within the physical environment.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation, which may be used to propagate a new state of an xR session. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects any errors in feature positions made by the propagation component. Moreover, the update component may compare the detected features to the existing map such that, if the detected features already exist in the map, the HMD's current position may be determined from known map points.

To enable positional tracking for SLAM purposes, HMDs 102A-B may use wireless, inertial, acoustic, or optical sensors. And, in many embodiments, different SLAM methods may use different positional tracking sources and/or devices. For example, wireless tracking may use a set of anchors or lighthouses 107A-B that are placed at locations within environment 100. Wireless tracking may also use one or more tokens 106 that may be held or attached to a user during an xR session. In addition, wireless tracking may also use one or tags 110 that may be positioned at various locations within environment 100 and may serve as reference points. Using such sources of wireless tracking information, HMDs 102A-B may triangulate their respective positions and/or states. Inertial tracking may use data from accelerometers and gyroscopes within HMDs 102A-B to find a velocity and position of HMDs 102A-B relative to some initial point. Acoustic tracking may use sonic sensors to determine the position of HMDs 102A-B by measuring time-of-arrival and/or phase coherence of transmitted and receive sound waves. Such forms of acoustic tracking may utilize low-frequency and/or high-frequency sonic sensors.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102A, and infrared markers 107A-B or tag 110 may be placed in known stationary locations. With outside-in tracking, camera 105 may be placed in a stationary location and infrared markers 106 may be placed on HMDs 102A or held by user 101A. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMDs 102A-B may be received by host IHSs 103A-B, which in turn execute one or more SLAM methods utilized by an xR application. In the case of an inside-out SLAM method, for example, an xR application receives the position and orientation information from HMDs 102A-B, determines the position of features extracted from the images captured by camera 108, and corrects the localization of landmarks in space using comparisons and predictions.

During a collaborative xR session, the sensors on HMD 102A and HMD 102B provide information regarding the physical environment 100 in which the collaborative xR session is being conducted. The effectiveness of different HMD sensors may impact the accuracy of the different SLAM methods in detecting and identifying features within a collaborative xR environment 100. For instance, a source of ambient light, such as window 109 in the co-located environment 100, may interfere with effectiveness of certain cameras and electromagnetic sensors utilized by HMD 102A and HMD 102B. Other sources of noise or interference may similarly impact the effectiveness of various other sensors utilized by HMD. As with the sunlight from a window 109, such sources of noise or interference may vary during the course of a co-located xR session. In addition, the HMD sensors of certain participants in a co-located xR session may be disparately affected based on their proximity to a source of noise or interference. For instance, an HMD of a user standing near the window 109 may experience significantly more noise and interference compared to participants located further from the window.

Such sources of noise and interference that may impact the effectiveness of sensors utilized by HMDs may differ in every physical environment. A myriad of factors may affect the amount of electromagnetic noise and interference within a room in which an xR session is being conducted. For instance, any window or other natural light source may be a source of optical noise and interference that may significantly affect the operation of cameras and other optical sensors. A window may also be source for other forms of electromagnetic noise and interference that may affect the operation of infrared and wireless sensors. Artificial light sources within a room hosting a xR session may similarly result in electromagnetic noise and interference that may vary at different locations within the room. Even windowless rooms may be affected by sources of electromagnetic and acoustic noise and interference that may affect effectiveness of various sensors utilized by an HMD. Each different physical environment in which collaborative xR sessions are conducted may have unique noise and interference characteristics. In participating in a co-located xR session, in HMD may rely on different sensors depending on the noise and interference characteristics of the environment in which the xR session is being conducted. Accordingly, an HMD may be calibrated to compensate for the noise and interference within a particular environment by relying on sensors that are subject to lesser amounts of noise and interference within that environment. The sensors themselves may be calibrated to compensate for sources of noise and interference, such as adjusting camera settings to compensate for bright or dark light conditions and adjusting the transmission power of acoustic sensors to compensate for noisy conditions.

In a collaborative xR session, different users may leave the xR session and new users may join the ongoing xR session. As a new user joins an ongoing xR session, the HMD worn by the joining user may be calibrated based on the physical characteristics of environment in which the xR session is being conducted. For instance, the HMD joining the ongoing xR session may be calibrated to compensate for the sources of noise and interference that may impact the effectiveness of the sensors utilized by the HMD. As described in additional detail below, the HMD joining the ongoing xR session may collaborate with HMDs already participating in the xR session in order to quickly calibrate the joining HMD to the particular sources of noise and interference in the physical environment which the xR session is conducted.

Figure 2:
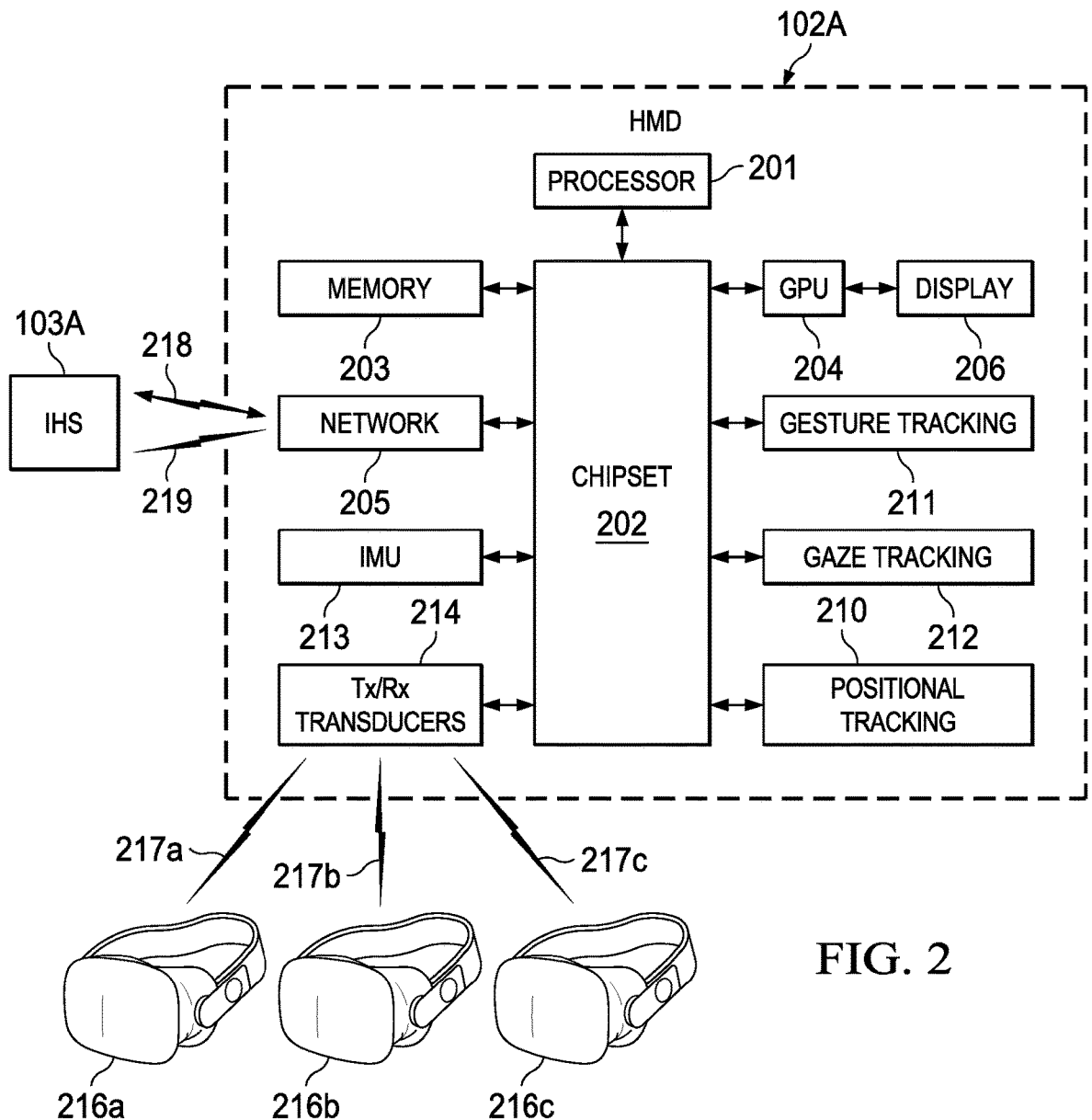
FIG. 2 is a diagram of an example of an HMD, according to some embodiments.

FIG. 2 is a block diagram illustrating certain components of an example HMD 102A that may be utilized within an xR system for collaborating with other HMDs participating in a co-located xR session with HMD 102A, according to some embodiments. As depicted, HMD 102A includes components configured to create and/or display an all-immersive virtual environment; and/or to overlay digitally-created content or images on a display, panel, or surface (e.g., an LCD panel, an OLED film, a projection surface, etc.) in place of and/or in addition to the user's natural perception of the real-world.

As shown, HMD 102A includes processor 201. In various embodiments, HMD 102A may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.). HMD 102A includes chipset 202 coupled to processor 201. In various embodiments, chipset 202 provides processor 201 with access to a number of resources.

For instance, chipset 202 provides processor 201 and/or graphics processor unit (GPU) 204 with access to memory 203. In various embodiments, memory 203 may be implemented using any suitable memory technology, such as static RAM (SRAM), dynamic RAM (DRAM), or any nonvolatile/Flash-type memory, such as a solid-state drive (SSD) or the like. Memory 203 may store program instructions that, upon execution by processor 201 and/or GPU 204, present an xR application to user 101A wearing HMD 102A, and may also present all or a portion of the xR application to user 101B wearing HMD 102B.

Chipset 202 may also be coupled to network interface 205 to support communications via various wired and/or wireless networks. For instance, as described regard to FIG. 1, an HMD may be coupled to a host IHS via a wired connection 218 that may be supported by network interface 205, such as the tether connecting HMD 102B to IHS 103B that is worn by the user 101B. Network interface 205 may also support a wireless connection 219 between HMD 102A and a host IHS, such as the wireless connection with IHS 103A.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206. As described, the display 206 of HMD 102A may include an immersive display element within a head-mounted device that is worn by a user participating in an xR session. In certain instances, the information provided via display 206 may be generated in full or in part by a host IHS by which HMD 102A participates in the xR session.

Other resources that may be coupled to processor 201 of HMD 102A through chipset 202 may include, but are not limited to: positional tracking system 210, gesture tracking system 211, gaze tracking system 212, and inertial measurement unit (IMU) system 213.

Positional tracking system 210 may include one or more optical sensors (e.g., a camera 108) configured to determine the movements of HMD 102A in relation to environment 100. For example, an inside-out tracking system 210 may be configured to implement markerless tracking techniques that use distinctive visual characteristics of the physical environment to identify specific images or shapes which are then usable to calculate HMD 102A's position and orientation within the environment 100.

Gesture tracking system 211 may include one or more cameras or optical sensors that enable user 101 to use their hands for virtual interaction with objects rendered by the visual display 206 of HMD 102A. For example, gesture tracking system 211 may be configured to implement hand tracking and gesture recognition in a 3D-space via a user-facing 2D camera or other optical sensor. In some cases, gesture tracking system 211 may track a selectable number of degrees-of-freedom (DOF) of motion, with depth information, to recognize dynamic gestures (e.g., swipes, clicking, tapping, grab and release, etc.) usable to control or otherwise interact with xR applications executed by HMD 102A and/or a host IHS to which HMD 102A may be coupled.

Gaze tracking system 212 may include an inward-facing projector configured to create a pattern of infrared (or near-infrared) light on the user's eyes, and an inward-facing camera configured to take high-frame-rate images of the eyes and their reflection patterns, which are then used to calculate the user's eye's position and gaze point. In some cases, gaze detection or tracking system 212 may be configured to identify a direction, extent, and/or speed of movement of the user's eyes in real-time, during execution of an xR application.

IMU system 213 may include one or more accelerometers and gyroscopes configured to measure and report a specific force and/or angular rate of movement of the user's head. In some cases, IMU system 213 may be configured to a detect a direction, extent, and/or speed of rotation (e.g., an angular speed) of the user's head in real-time, during execution of an xR application.

HMD 102A may utilize variety of sensors to support communication protocols allowing HMD 102A to collaborate directly 217a-c with other co-located HMDs 216a-c participating the xR session. Transmit (Tx) and receive (Rx) transducers and/or transceivers 214 of HMD 102A may include any number of sensors and components configured to send and receive communications using different physical transport mechanisms. For example, Tx/Rx transceivers 214 may include electromagnetic (e.g., radio-frequency, Wi-Fi, infrared, optical, etc.) and acoustic (e.g., ultrasonic, subsonic) transport mechanisms configured to send and receive communications 217a-c, to and from other HMDs 216a-c, under control of processor 201. Across different instances of HMDs, components of Tx/Rx transceivers 214 may vary in the number and types of sensors that are used. These sensors may be integrated into the HMD 102A or may be mounted on the external portion of frame of HMD 102A. In certain embodiments, HMD 102A may support simultaneous broadcast transmissions via different transport mechanisms that are supported by the transceivers of the HMD.

In some implementations, HMD 102A may communicate with a host IHS 103A via a wired connection 218, such as a cable by which IHS 103A may be tethered to and worn by a user, such as IHS 103B of FIG. 1. HMD 102A may also communication with a host IHS 103A via wireless connections 219 (e.g., WiGig, WiFi, etc.). For example, if host IHS 103A has more processing power and/or better battery life than HMD 102A, host IHS 103A may be used to offload some of the processing involved in the creation of the xR experience.

In various embodiments, HMD 102A may not include each of the components shown in FIG. 2. Additionally, or alternatively, HMD 102A may include components in addition to those shown in FIG. 2. Furthermore, components represented as discrete entities in FIG. 2 may, in some embodiments, be integrated with other components. In various implementations, all or a portion of the functionality provided by the illustrated components may be provided by components integrated as a System-On-Chip (SOC), or the like.

Figure 3:
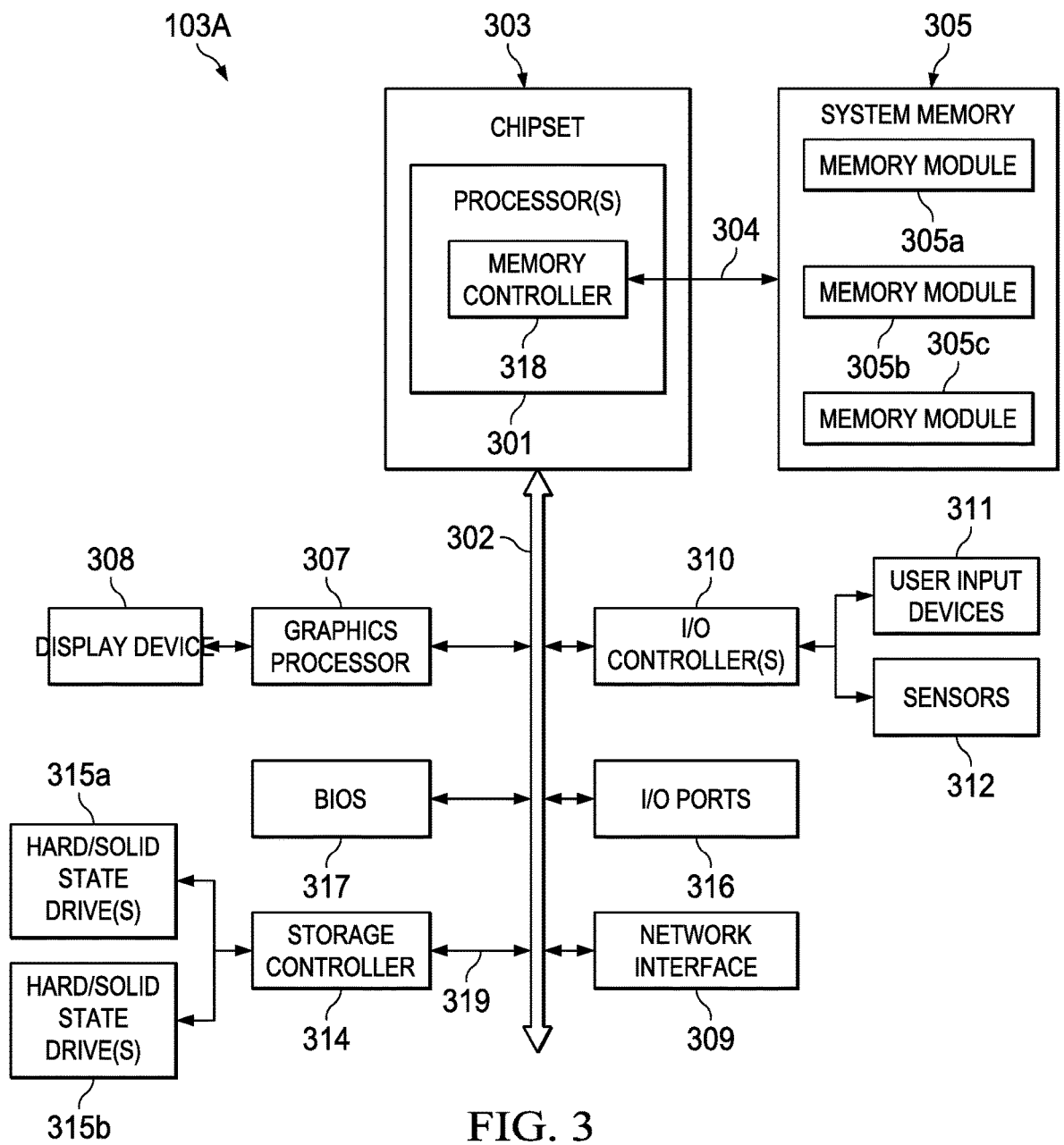
FIG. 3 is a diagram of a host Information Handling System (IHS), according to some embodiments.

FIG. 3 is a block diagram illustrating certain components of an example IHS 103A, according to some embodiments, that may be utilized within an xR system for supporting collaboration between HMDs that are participating in a co-located xR session. For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

IHS 103A includes one or more processors 301, such as a Central Processing Unit (CPU), to execute code retrieved from a system memory 305. Although IHS 103A is illustrated with a single processor 301, other embodiments may include two or more processors, that may each be configured identically, or to provide specialized processing functions. Processor 301 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In FIG. 3, the processor 301 includes an integrated memory controller 318 that may be implemented directly within the circuitry of the processor 301, or the memory controller 318 may be a separate integrated circuit that is located on the same die as the processor 301. The memory controller 318 may be configured to manage the transfer of data to and from the system memory 305 of the IHS 103A via a high-speed memory interface 304.

The system memory 305 that is coupled to processor 301 via the memory bus 304 provides the processor 301 with a high-speed memory that may be used in the execution of computer program instructions by the processor 301. Accordingly, system memory 305 may include memory components, such as such as static RAM (SRAM), dynamic RAM (DRAM), NAND Flash memory, suitable for supporting high-speed memory operations by the processor 301. In certain embodiments, system memory 305 may combine both persistent, non-volatile memory and volatile memory.

In certain embodiments, the system memory 305 may be comprised of multiple removable memory modules. The system memory 305 of the illustrated embodiment includes three removable memory modules 305*a*, 305*b* and 305*c*. Each of the removable memory modules 305*a-c* may correspond to a motherboard memory socket that receives a removable memory module 305*a-c*, such as a DIMM (Dual In-line Memory Module), that can be coupled to the socket and then decoupled from the socket as needed, such as to upgrade memory capabilities or to replace faulty components. Other embodiments of IHS 103A may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 103A utilizes a chipset 303 that may include one or more integrated circuits that are connected to processor 301. In the example of FIG. 3, processor 301 is depicted as a component of chipset 303. In other embodiments, all of chipset 303, or portions of chipset 303 may be implemented directly within the integrated circuitry of the processor 301. Chipset 303 provides the processor(s) 301 with access to a variety of resources accessible via bus 302. In IHS 103A, bus 302 is illustrated as a single element. Various embodiments may utilize any number of buses to provide the illustrated pathways served by bus 302.

As illustrated, a variety of resources may be coupled to the processor(s) 301 of the IHS 103A through the chipset 303. For instance, chipset 303 may be coupled to a network interface 309, such as provided by a Network Interface Controller (NIC) that is coupled to the IHS 103A and allows the IHS to communicate via a network, such as the Internet or a LAN. Network interface device 309 may provide IHS 103A with wired and/or wireless network connections via a variety of network technologies, such as wireless cellular or mobile networks (CDMA, TDMA, LTE etc.), WIFI and BLUETOOTH. In certain embodiments, IHS 103A may utilize network interface 309 to establish connections to other IHSs that are also hosting the participation of an HMD in an xR session, (e.g., via Ethernet, WiFi, or WiFi Direct), thus allowing the host IHSs to cooperate in the operation of the xR application.

Chipset 303 may also provide access to one or more display device(s) 308 via graphics processor 307. In certain embodiments, graphics processor 307 may be comprised within one or more video or graphics cards or an embedded controller installed as components of the IHS 103A. Graphics processor 307 may generate display information and provide the generated information to one or more display device(s) 308 coupled to the IHS 103A. In certain embodiments, graphics processor 307 may be integrated within processor 301. The one or more display devices 308 coupled to IHS 103A may utilize LCD, LED, OLED, or other thin film display technologies. Each display device 308 may be capable of touch input such as via a touch controller that may be an embedded component of display device 308, graphics processor 307, or a separate component of IHS 103A accessed via bus 302.

As described, in certain instances, processing necessary for the user's participation in an xR session may be offloaded from the user's HMD to the host IHS. For instance, the host IHS may receive various inputs from the user's HMD, such as sensor inputs describing the movements of the user, and use the inputs to generate the responsive visual information to be presented to the display of the user's HMD. In such scenarios, graphics processor 307 of IHS 103A may be utilized to generate display information that is transmitted to the hosted HMD for display to the user.

In certain embodiments, chipset 303 may utilize one or more I/O controllers to access hardware components such as user input devices 311 and sensors 312. I/O controller 310 may provide access to user-input devices 310 such as a keyboard, mouse, touchpad, touchscreen and/or other peripheral input devices. In certain embodiments, I/O controllers may support an HMD, such as HMD 102A that is coupled to the IHS 103A. Coupled in this manner, IHS 103A may execute and host an xR application that is displayed via the coupled HMD. In certain embodiments, I/O controllers may also be configured to receive xR application inputs from a connected HMD. The user input devices and HMD may interface with the I/O controller 310 through wired or wireless connections.

Sensors 312 accessed via I/O controllers 310 may provide access to data describing environmental and operating conditions of IHS 103A. Such data may be used to manage the operation of IHS 103A, such as by controlling a cooling system of the IHS. Other components of IHS 103A may include one or more I/O ports 316 for communicating with peripheral external devices as well as various input and output devices. For instance, I/O ports 316 may include USB (Universal Serial Bus) ports, by which a variety of external devices, such as an HMD, may be coupled to IHS 103A.

As illustrated, IHS 103A also includes a BIOS (Basic Input/Output System) 317 that may be stored in a non-volatile memory accessible by chipset 303 via bus 302. The BIOS 317 provides an abstraction layer that allows the operating system to interface with the hardware components of the IHS 103A. Upon powering or restarting IHS 103A, processor(s) 301 may utilize BIOS 317 instructions to initialize and test hardware components coupled to the IHS 103A, including both components permanently installed as components of the motherboard of IHS 103A and removable components installed within the various expansion slots supported by the IHS 103A. The BIOS 317 instructions may also load an operating system for use by the IHS 103A. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the BIOS may be replaced, in full or in part, by a baseboard management controller (BMC) or another in-band or out-of-band controller that supports remote administration of IHS 103A.

In the illustrated embodiment, IHS 103A includes two storage drives 315*a-b*. In various embodiments, the storage drives 315*a-b* may include SAS (Serial Attached SCSI) magnetic disk drives, SATA (Serial Advanced Technology Attachment) magnetic disk drives, solid-state drives (SSDs) and other types of storage drives in various combinations. Each of the storage drives 315*a-b* may be located within the enclosure of the IHS 103A, or alternatively one or more of the storage drives 315*a-b* may instead be external to IHS 103A. One or more of the storage drives 315*a-b* may instead be located remotely from IHS 103A and may be configured as network attached storage devices. In providing storage services, IHS 103A may utilize a storage controller 314 that provides access to the two storage drives 315*a-b*. Storage controller 314 may be comprised of hardware and software that is configured to provide storage and retrieval of data from the storage drives 315*a-b*. Storage controller 314 may be configured to provide access to the storage drives 315*a-b* as a single logical storage device as part of a distributed data storage solution. Certain embodiments may utilize additional storage controllers that provide access to additional storage devices.

In various embodiments, an IHS 103A does not include each of the components shown in FIG. 3. In various embodiments, an IHS 103A may include various additional components in addition to those that are shown in FIG. 3. Furthermore, some components that are represented as separate components in FIG. 3 may in certain embodiments instead be integrated with other components. For example, in certain embodiments, all or a portion of the functionality provided by the illustrated components may instead be provided by components integrated into the one or more processor(s) 301 as a systems-on-a-chip.

HMDs are highly desirable in collaborative environments. For example, two or more co-located users with HMDs may view a common virtual 3D model or artifact presented within an xR application. Each xR system, including an HMD and an associated host IHS (e.g., a first xR system comprises HMD 102A and host IHS 103A, and a second xR system comprises HMD 102B and IHS 103B), whether physically in the same package or not, may be configured to identify other co-located xR systems as intended collaborators, and to communicate with other xR systems during a collaborative xR session.

Figure 4:
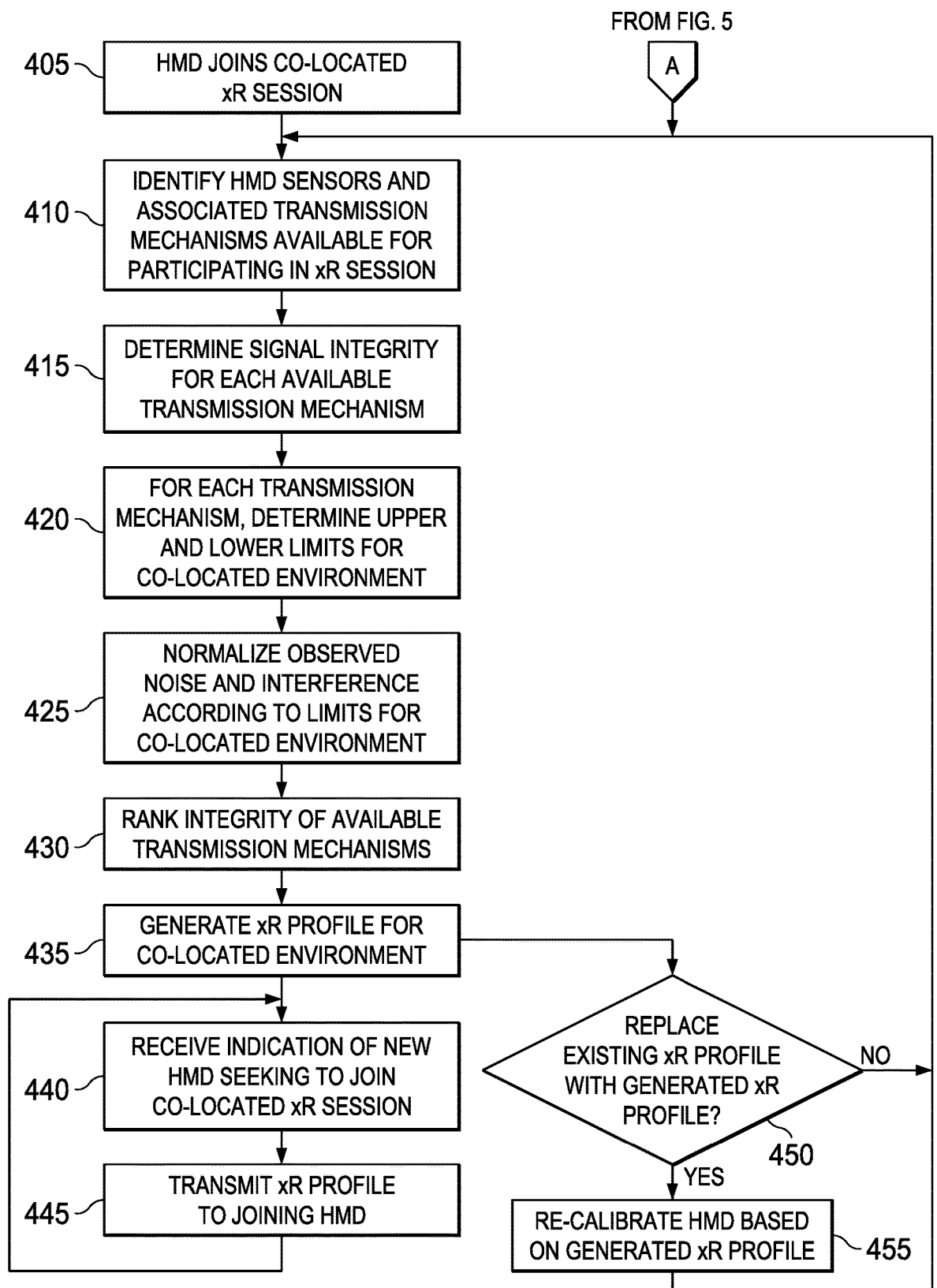
FIG. 4 is a flowchart of an example of a method for the generation of an xR profile for a co-located xR session, according to some embodiments.

FIG. 4 is a flowchart of an example of a method for the generation of an xR profile for a co-located xR session, according to some embodiments. The illustrated embodiment begins at step 405 with an HMD joining an xR session. In certain scenarios, the HMD may be the first participant in the xR session, in which case the HMD proceeds to step 410 and begins generating an xR profile of the physical environment in which the co-located xR session will be conducted. In scenarios where the HMD is joining an ongoing xR session, the HMD may operate as described with regard to FIG. 5, in which an HMD broadcasts a discovery beacon via available transport mechanisms in order to query the participants in the ongoing xR session for an xR profile of the physical environment.

At step 410, the HMD begins generating a profile of the physical environment in which the co-located xR session is being conducted by identifying sensors and associated transmission mechanisms to be tested for use in the xR session. In certain embodiments, the HMD initiates procedures for generating a profile of the noise and interference that may affect the sensors of the HMD within the physical environment. As described above, an HMD may utilize a variety of sensors that support the operation of the xR application, such as determining the user's position and orientation within the physical environment, identifying gestures and other movements by the user, identifying and tracking the location of physical objects located within the physical environment, and communicating directly with other HMDs participating in the co-located xR session. In generating an xR profile of the physical environment, the HMD identifies the sensors and associated transmission mechanisms that are available for use and that will be tested and included within the xR profile.

With the sensors identified, at step 415, the characteristics of the physical environment are evaluated with regard to their impact on the transmission mechanisms that may be utilized by an HMD participating in a collaborative xR session within the physical environment. In certain embodiments, the HMD may determine various levels of background noise and interference within the physical environment. During this process, the user wearing the HMD may be prompted to remain relatively still while the HMD sensors are being used to test the noise and interference within physical environment. In other scenarios, the user wearing the HMD may be prompted to stand in one location within the physical environment and rotate in a complete circle while the HMD sensors are testing the noise and interference. If the user wearing the HMD is moving during the testing of the sensors, the HMD may conduct sensor testing measurements at discrete locations during such movements by the user. The HMD may also generate a weighted average of the sensor measurements if the user moves substantially during the testing process.

In certain embodiments, each of the identified sensors may be activated and procedures may be initiated for testing the background noise and interference that may affect each of these sensors and the associated transmission mechanisms. For certain sensors utilized by an HMD, the background noise and interference within the physical environment of the xR session may be measured by the HMD transmitting sequences of test messages within the environment. For instance, referring to FIG. 1, the HMD 102A may begin testing the background noise and interference within physical environment 100 by broadcasting a sequence of test messages. The test messages broadcast by HMD 102A may be received by various components within the physical environment 100.

For instance, HMD 102A may broadcast test messages that are received by anchors 107A and 107B located within environment 100. In certain embodiments, anchors 107A and 107B may be configured to evaluate the interference caused by background noise by comparing the signal integrity of received test messages against a reference test message signals. In such embodiments, anchors 107A and 107B may transmit a message to HMD 102A indicating the integrity of the transmission by HMD 102A, thus providing HMD 102A with an indication of the level of background noise and interference affecting the transmission of communications via the transmission mechanism used to broadcast the test messages.

In certain embodiments, the anchors 107A and 107B may be configured to respond to a sequence of test messages from HMD 102A by replying with a corresponding sequence of reply messages. Based on these reply messages, HMD 102A may calculate the effect of background noise and interference within environment 100, thus providing an indication of the level of background noise and interference affecting the receipt of communications via the transmission mechanism used by anchors 107A and 107B to transmit the reply messages.

In this manner, HMD 102A may iterate through the available transmission mechanisms and test each of them for levels of background noise and interference in the co-located xR environment. For instance, HMD 102A may repeat the described tests message procedure with anchors 107A and 107B using each of the transmission mechanisms supported by the anchors. The test message procedure may also be repeated by HMD 102A with various other xR components located within the environment. For instance, HMD 102A may exchange a similar sequence of test and reply messages with components such as a host IHS (e.g., 103A, 103B), a stationary camera (e.g., 105), a tag (e.g., 110) worn by a user or a stationary marker (e.g., 106). In certain embodiments, HMD 102A may exchange sequences of test and reply messages with other co-located HMDs that are operational, such as HMD 103A.

Based on these test messages, a measure of signal integrity, such as a signal-to-noise ratio (SNR), may be determined for each of available transmission mechanism. Separate signal-to-noise ratios may be determined for transmitted messages and received messages using each of the tested transmission mechanisms. In certain instances, a signal-to-noise ratio may be a weighted average of signal-to-noise ratios that have been calculated based on testing measurements exchanged by an HMD at different locations within the physical environment.

At step 420, xR characteristics may be determined for the physical environment in which the co-located xR session is conducted. As described, each physical environment may have unique sources of background noise and interference that may impact the effectiveness of certain transmission mechanisms within that physical environment. A room with plentiful ambient light may exhibit significantly greater amounts of electromagnetic noise and interference compared to a room with only artificial light sources. Accordingly, the range of possible noise and interference may be much greater for the room with ambient light compared to the room with only artificial light. In describing such variations, each room hosting an xR session may be characterized by a range of acceptable environmental conditions that will support xR sessions.

In certain embodiments, xR profiles generated by HMDs may be used to generate a profile of typical conditions within an xR environment. In particular, xR profiles generated by different HMDs within the co-located environment may be collected and utilized to generate ranges of typical noise and interference for the co-located environment. For instance, anchors such as 107A and 107B that are permanently located within environment 100 may monitor for broadcasts of xR profiles and may analyze the xR profiles in order to generate ranges of typical background noise and interference for environment 100.

The ranges of typical background noise and interference for the co-located xR environment may be normalized at step 425 in order to facilitate relative comparisons between the signal integrity observed in the different transmission mechanisms tested by the HMD at step 415. For instance, lighting levels within a specific environment may range in value from 0 to 90 lumen. Typical infrared noise and interference within an environment may be similarly characterized. Similarly, typical noise within the audible sound range within the specific environment may range from 40 to 90 decibels. Other sonic frequency ranges, such as for subsonic and ultrasonic communications, may be characterized by different ranges typical noise and interference within the environment. These different ranges of the typical background noise and interference may be normalized such that all of the ranges are on the same scale, allowing tests of these transmission mechanisms to be compared directly. For instance, in the above scenario, typical noise and interference from each source may be normalized to a scale from 0 to 100.

At step 430, the background noise and interference levels determined at step 415 are evaluated against the typical levels of background noise and interference for the physical environment in which the xR session is conducted in order to determine relative reliability of the available transmission mechanisms. For instance, an HMD may generate an ordered list of the available transmission mechanisms, where the transmission mechanisms may be ranked in the ordered list based on comparisons of the measured background noise and interference affecting each of the transmission mechanisms. Such comparisons may be made by converting the measured background noise and interference for each transmission medium to the normalized scale of step 425 such that the relative levels of background noise and radiation for each transmission medium may be ordered and compared.

At step 435, the HMD generates an xR profile for the physical environment of the xR session. In certain embodiments, the xR profile may include the ordered list of transmission mechanisms that indicates the integrity of the available signaling techniques and the effectiveness of available sensors, where the ordering is based on the signal reliability measurements performed by the HMD generating the xR profile. For instance, in xR profile may include an ordered list of transmission mechanisms that lists infrared communications as the most reliable transmission mechanism within an xR environment that does not include any meaningful sources of background noise or interference with regard to infrared communications. However, in a different xR environment that includes one or more windows that provide ambient light, infrared communications may suffer from significantly greater amounts of noise and interference due to the window. In such scenarios, the impact on the reliability of infrared communications may result in infrared communications being listed lower in the xR profile.

The ordered list of the xR profile may then list ultrasonic communications as the next most reliable transmission medium. For instance, the xR environment may be a conference room or other meeting room in which multiple collaborators may view and interact with a three-dimensional model, such as a model of a building or a mechanical part. Each participant may be supported by a host IHS, such as a laptop computer. In addition, conventional projection screen displays may be used in conjunction with the collaboration on the 3-D model. The conference room may also include teleconferencing equipment to support remote participation. Each of these devices may be a source of certain amounts of high-frequency noise that may result in localized sources of interference for ultrasonic communications.

The ordered list of the xR profile may then list subsonic communications as the least reliable transmission medium. For instance, the proximity of an HVAC system to the conference room may result in high levels of subsonic noise during certain periods of the HVAC's operation, thus rendering the conference room generally unsuitable for subsonic communications during these periods. However, during other periods of the HVAC's operation, the levels of subsonic noise may allow subsonic communications, such that subsonic communications may be listed higher within the xR profile during such intervals.

In certain scenarios, an xR profile may include signal reliability rankings for the different transmission mechanisms as determined at different locations within the xR environment. In such scenarios, the reliability rankings may differ at various locations within the xR environment. For instance, the location of windows on one side of conference room in which the xR session is being conducted may result in high levels of noise and interference for infrared communications at locations near such windows. An xR profile may thus include transmission mechanism reliability rankings for a location away from the windows, in which infrared communications may be listed as a reliable transmission mechanism, and for a location near the windows, in which infrared communications may be listed as an unreliable transmission mechanism. In scenarios where transmission mechanisms tests are conducted at different locations within an environment, the xR profile may include reliability rankings that are based on a weighted average of such reliability tests.

In certain scenarios, an xR profile may include additional information that may be of use to a receiving HMD. If the xR profile provides information regarding a single location within the xR environment, the xR profile may indicate an indication of a location at which the xR profile was generated. If the xR profile provides information regarding multiple locations, multiple different background noise and interference profiles may be included in the xR profile, each noise and interference profile specifying a corresponding location within the xR environment. In scenarios where an xR profile includes information indicating a location where the profile was generated by an HMD, a reported location of the HMD may be specified relative to a previously reported location for that HMD. Based on such periodic location updates reported in discovery beacons and xR profiles, an HMD may track the movement of other HMDs within the co-located environment.

In certain embodiments, location information specified within an xR profile may include a coordinate system utilized by the reporting HMD. For instance, the HMD may report a location relative to a landmark, whether physical or virtual, within the xR session environment. In certain embodiments, the location information provided within an xR profile may be utilized by an HMD to determine the proximity of neighboring HMDs. In certain embodiments, proximity information for neighboring HMDs may be further determined based on triangulation of the discovery beacons that are received from an HMD via each of the different transmission mechanisms used to broadcast a discovery beacons. In certain embodiments, proximity to neighboring HMDs may be measured based on the power of the received discovery beacon signal in order to generate a Received Signal Strength (RSS). Based on the measured RSS, the HMD may approximate a distance to the neighboring HMDs.

In certain scenarios, an xR profile may specify a preferred mode of communications with the HMD that generated the xR profile. In generating an xR profile, an HMD may determine preferred transmission mechanisms, which may be independently determined for transmission and receipt of xR session communications. Such preferences may be included within an xR profile, thus providing the receiving HMD with preferred transmission protocols for communicating with the HMD providing the xR profile.

Once the xR profile is generated, the HMD may determine, at step 450, whether to replace the operative xR profile currently in use by the HMD. For instance, as described with regard to FIG. 5, a newly joining HMD may receive an xR profile from an HMD already participating in an ongoing xR session. Using the received xR profile, the joining HMD may use the received xR profile in order to calibrate its sensors and select transmission mechanisms for participating in the co-located xR session. However, as described, sources of noise and interference may impact the effectiveness of different transmission mechanisms to varying degrees at various locations within the environment of the co-located xR session.

An xR profile may allow the joining HMD to quickly begin participating in the ongoing xR session, but the xR profile may have been generated from a different location within the environment that experiences different amounts background noise and interference compared to the location of the joining HMD. Accordingly, a joining HMD may use a received xR profile to join an ongoing xR session, as described with regard to FIG. 5, and may subsequently begin generating its own xR profile, at step 410, based on the observed background noise and interference at its specific location within the co-located environment.

In such scenarios, at step 450, the HMD may determine to replace the received xR profile with its own xR profile that is particularized to its specific location and sensor capabilities. If the newly generated xR profile replaces an operative xR profile, at step 455, the HMD may utilize the new xR profile to calibrate the sensors of the HMD and to adjust the selection of transmission mechanisms being used by the HMD in participating in the xR session. As indicated in FIG. 4, the HMD may continue to periodically update its own xR profile. Such updates may replace an operative xR profile, or such updates may be used to augment an operative xR profile, such as by providing an ordered listing of transmission mechanisms reliabilities at different locations within the environment of an xR session.

Figure 5:
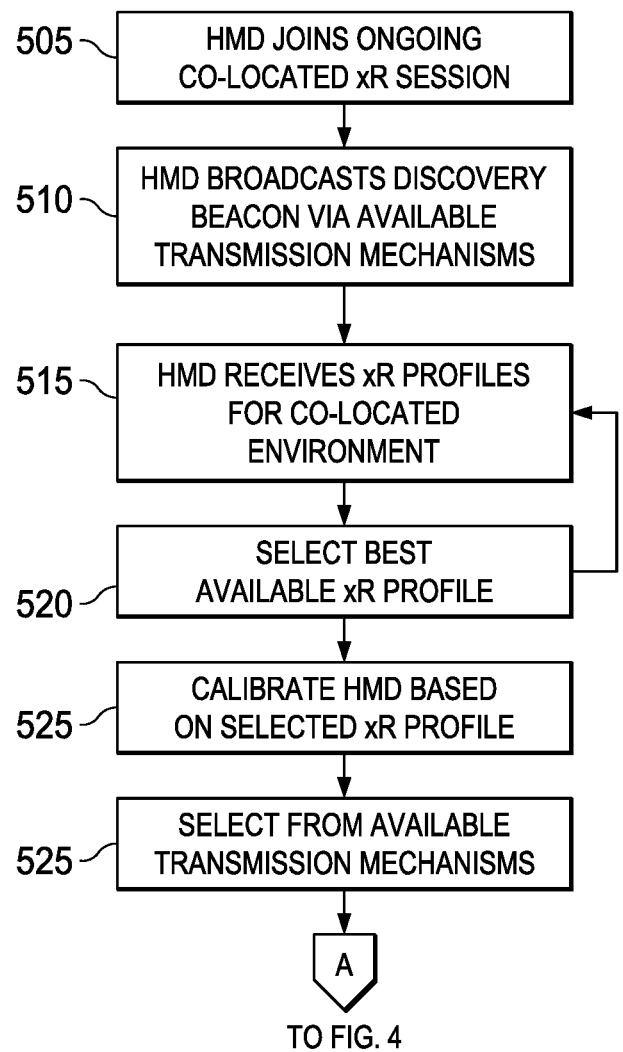
FIG. 5 is a flowchart of an example of a method for joining a co-located xR session using an xR profile for the co-located xR session.

At step 440, the HMD receives an indication of an HMD seeking to join the co-located xR session, such as described with regard to FIG. 5. The joining HMD may broadcast a discovery beacon indicating a request to join the co-located xR session. Once admitted to the xR session, the HMD may periodically broadcast the discovery beacon to request authorization to continue participation in the xR session. In response to the receipt of a discovery beacon, at step 445, the HMD may transmit the xR profile for the physical environment of the co-located xR session. The xR profile may then be used by the joining HMD to calibrate its sensors and to select transmission mechanisms in order to begin participating in the xR session as soon as the user of the joining HMD is successfully authenticated.

As indicated in FIG. 4, upon joining an xR session, an HMD may return to step 410 in order to determine if updates to the operative xR profile are warranted. For instance, an HMD may periodically determine the signal integrity of available transmission mechanisms, thus accounting for any environmental changes resulting in changes in noise and interference within the co-located xR session environment. Certain embodiments may additionally or alternatively trigger updates to the xR profile of a user's HMD based on a detected change in of the location of the user within the environment.

FIG. 5 is a flowchart of an example of a method for joining a co-located xR session using an xR profile describing the environmental conditions for the co-located xR session. In the scenario of FIG. 5, an HMD seeks to join an ongoing, co-located xR session at step 505. For instance, in reference to FIG. 1, user 101B may seek to join in an ongoing xR session in which user 101A is already participating via HMD 102A. In order to begin participating in the ongoing xR session, the joining HMD may require authentication as an authorized participant in the xR session. In certain embodiments, authentication of the joining HMD may be required prior to allowing any other interactions with the joining HMD. In certain embodiments, the described collaboration with an HMD joining an ongoing xR session may proceed prior to, or in parallel with, procedures for authenticating the user wearing the joining HMD.

At step 510, joining HMD broadcasts a discovery beacon within the co-located xR session environment. In certain scenarios, the discovery beacon may include information that may be utilized to authenticate the joining HMD and/or the user wearing the joining HMD. As described, the discovery beacon may also include information specifying a relative location of the joining HMD within the co-located environment. In addition, the discovery beacon may also include information describing the communication and sensor capabilities of the joining HMD. The discovery beacon may also include communication protocol preferences of the joining HMD.

In certain embodiments, a joining HMD may broadcast a discovery beacon using multiple transmission mechanisms supported by the HMD. While seeking to join an ongoing xR session, the joining HMD may not have any certainty regarding the transmission mechanisms that are supported by the HMDs already participating in the xR session. Accordingly, the joining HMD may simultaneously broadcast a discovery beacon via multiple different transmission mechanism, thus improving the likelihood of successfully establishing communications with an HMD participating in the ongoing xR session.

In response to the discovery beacon broadcasts, at step 515, the joining HMD receives one or more reply messages that include xR profiles for the co-located xR session environment. As described with regard to FIG. 4, an HMD participating in an ongoing xR session may test the reliability of transmission mechanisms that are supported by the HMD in order to generate a profile of the background noise and interference within the physical environment for each of the available transmission mechanisms. Such xR profiles of an xR environment may be generated and transmitted in response to an HMD broadcasting a discovery beacon in order to join the ongoing xR session.

At step 520, the joining HMD selects the most useful of the received xR profiles of the co-located environment. As described, an xR profile specifies the relative degree to which the available transmission mediums are affected by background noise and interference within the co-located environment. In scenarios where the xR profile is generated by an HMD that is stationary, the xR profile may be most applicable near the location of the HMD that generated the xR profile. As described, sources of noise and interference may affect different areas of a co-located xR environment differently. Accordingly, the joining HMD may select a received xR profile that was generated from the location nearest the location of the joining HMD within the co-located environment.

In other scenarios, the xR profiles received by a joining HMD may not reflect any significant variations in background noise and interference at different locations within the co-located environment. For instance, some co-located xR environments may be selected based on a lack of any sources of noise or interference. In other scenarios, the received xR profiles may not be associated with any particular location within the co-located environment. Accordingly, a joining HMD may select from the received xR profiles based on similarities between the joining HMD and an HMD that has transmitted an xR profile. For instance, the joining HMD may select an xR profile from an HMD that is the same make and/or model as the joining HMD, or from an HMD that has the same array of sensors as the joining HMD and thus supports the same transmission mechanisms as the joining HMD. In certain scenarios, a joining HMD may support different transmission mechanisms than other participating HMDs. In such scenarios, the joining HMD may thus receive xR profiles including reliability rankings for transmission mechanisms that are not supported by the joining HMD, or that are presently unavailable for use by the joining HMD. Accordingly, the joining HMD may select an xR profile based on the number of applicable transmission mechanism reliability rankings that are included in the profile. In certain embodiments, the joining HMD may also select an xR profile based on local constraints of the joining HMD, such as available battery power which may limit the availability of certain sensors or transmission mechanisms that may otherwise be available to the joining HMD.

In certain embodiments, a joining HMD may select a previously saved xR profile rather than utilize an xR profile received from another HMD. For instance, an HMD user participating in an xR session may temporarily leave the session. Prior to exiting, the most recent xR profile generated by the HMD may be saved by the HMD directly or may be saved to the host IHS that supports the HMD. Upon rejoining the xR session, the HMD may choose between xR profiles received in response to its discovery beacon seeking to rejoin the session and a previously saved xR profile. In scenarios such as where the HMD's absence from the xR session is relatively brief or the noise and interference varies significantly within the co-located environment, a previously saved xR profile may provide a re-joining HMD with the most accurate xR profile for rejoining the xR session.

Once an xR profile for the co-located environment is selected, at step 525, the selected xR profile may be used to calibrate the joining HMD. In particular, the xR profile may be used to calibrate the sensors and transmission mechanisms to be utilized by the joining HMD in participating in the ongoing xR session. For instance, in a co-located xR environment with a significant amount of ambient light, the optical sensors and other electromagnetic sensors of the joining HMD may be adjusted in order to compensate for the background noise and interference resulting from the ambient light source. For example, certain sensors, such as cameras and infrared sensors, may utilize filters that may be adjusted in order to compensate for the specific characteristics of the ambient light characteristics that have been detected in the co-located xR environment and specified within an xR profile. Sensors may also be adjusted to utilize different transmission protocols, or to make adjustments to transmission protocols, based on levels of background noise and interference indicated by the selected xR profile. For instance, within a co-located xR environment that includes a significant amount of wireless noise and interference, the wireless transmission protocols utilized by the joining HMD may be adjusted to utilize additional error detection mechanisms, such as use of additional parity bits and/or checksums.

At step 530, the joining HMD utilizes the selected xR profile to select from the transmission mechanisms available for participating in the co-located xR session. In certain embodiments, an xR profile may provide an ordered listing of the available transmission mechanisms that have been ranked according to their determined signal integrity. For instance, an xR profile may order the available transition mediums to reflect high levels of noise and interference for certain of the available transmission mechanisms and lower levels of noise and interference for other transmission mechanisms. Based on such rankings, the joining HMD may select from the available transmission mechanisms for participation in the co-located xR session.

In certain embodiments, an xR profile may indicate one or more preferred transmission mechanisms for the HMD that generated the xR profile. The joining HMD may select available transition mechanisms for signaling directly with another HMD based on the xR profile received from that particular HMD. For instance, the joining HMD may select the use of infrared communications with a co-located HMD that has provided an xR profile that indicates the co-located HMD is in an area with significant noise or interference for other transmission mechanisms. The HMD may similarly select ultrasonic communications with a different co-located HMD that has provided in xR profile that indicates significant infrared noise or interference, such as due to being located near a window. The joining HMD may similarly utilize information within the selected xR profile to select transmission mechanisms for signaling with other components of the xR session, such as anchors 107A and 107B.

Using the xR profile, the joining HMD may quickly begin participation in the ongoing xR session. As described, in certain instances, the user wearing the joining HMD must first be authenticated prior to being admitted to the ongoing xR session. Once admitted to the xR session, the joining HMD may utilize the procedures set forth with regard to FIG. 4 to generate an xR profile that describes the signal integrity of the transmission mechanisms at the location of the joining HMD. As described, the joining HMD may then utilize its own version of the xR profile of the co-located xR environment and may then distribute that generated xR profile to additional HMDs seeking to join the xR session.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A first Head-Mounted Device (HMD) configured for participating in a co-located virtual, augmented, or mixed reality (xR) session in a first physical environment, comprising:
   a processor;
   a plurality of sensors, each sensor associated with one or more transmission mechanisms for participating in the co-located xR session; and
   a memory coupled to the processor, the memory having program instructions stored thereon that, upon execution, cause the first HMD to:
      determine, via the plurality of sensors, a signal integrity within the first physical environment for the transmission mechanisms available for participating in the co-located xR session;
      generate an xR profile for the first physical environment based on the determined signal integrity for each transmission mechanisms;
      receive an indication of a second HMD seeking to join the co-located xR session; and
      transmit the xR profile to the second HMD for use in calibrating the second HMD for participating in the co-located xR session.

2. The first HMD of claim 1, wherein the signal integrity comprises a signal-to-noise ratio within the first physical environment for each of the transmission mechanisms.

3. The first HMD of claim 2, wherein the program instructions, upon execution, further cause the first HMD to:
   normalize the determined signal-to-noise ratios based on thresholds for use of the respective transmission mechanisms for an xR session within the first physical environment.

4. The first HMD of claim 3, wherein the signal integrity of the transmission mechanisms available for participating in the co-located xR session is specified based on one or more rankings of the normalized signal-to-noise ratios for the transmission mechanisms available within the first physical environment.

5. The first HMD of claim 4, wherein the xR profile for the first physical environment specifies a ranking of the transmission mechanisms available within the xR session for communicating directly with the first HMD.

6. The first HMD of claim 5, wherein the xR profile for the first physical environment specifies a ranking of the transmission mechanisms available for participating in the xR session.

7. The first HMD of claim 1, wherein signal integrity is determined by exchanging signal integrity test messages with devices participating in the xR session.

8. The first HMD of claim 2, wherein the devices comprise a third HMD participating in the xR session.

9. A first Head-Mounted Device (HMD) configured for participating in a co-located virtual, augmented, or mixed reality (xR) session in a first physical environment, comprising:
   a processor;
   a plurality of sensors, each sensor associated with a transmission mechanism for participating in the co-located xR session; and
   a memory coupled to the processor, the memory having program instructions stored thereon that, upon execution, cause the first HMD to:
      broadcast a discovery beacon signaling a request by the first HMD to join the co-located xR session;
      in response to the beacon, receive a plurality xR profiles for the first physical environment, wherein the xR profiles are transmitted by HMDs participating in the co-located xR session, and
      wherein the xR profile specifies a signal integrity of the transmission mechanisms available for participating in the co-located xR session in the first physical environment;
      select a first xR profile from the plurality of received xR profiles, wherein the first xR profile is generated by a second HMD of the HMDs participating the co-located xR session; and
      calibrate the plurality of sensors for participation in the co-located xR session based on the signal integrity of the transmission mechanisms specified in the first xR profile.

10. The first HMD of claim 9, wherein the signal integrity specified in the first xR profile comprises a signal-to-noise ratio within the first physical environment for each of the transmission mechanisms.

11. The first HMD of claim 10, wherein the signal-to-noise ratio is determined by exchanging signal integrity test messages with devices participating in the xR session.

12. The first HMD of claim 9, wherein the first xR profile is selected from the plurality of received xR profiles based on a proximity of the first HMD to the second HMD within the first physical environment.

13. The first HMD of claim 12, wherein the first xR profile is selected from the plurality of received xR profiles based on a similarity between the first HMD and the second HMD.

14. The first HMD of claim 9, wherein the first xR profile specifies a plurality of signal integrities for the transmission mechanism, each signal integrity determined at a discrete location with the first physical environment.

15. The method for participating in a co-located virtual, augmented, or mixed reality (xR) session in a first physical environment using a first Head-Mounted Device (HMD), the method comprising:
   determining via a plurality of sensors, each associated with one or more transmission mechanisms for participating in the co-located xR session, a signal integrity within the first physical environment for the transmission mechanisms;
   generating an xR profile for the first physical environment based on the determined signal integrity for each of the transmission mechanisms;
   receiving an indication of a second HMD seeking to join the co-located xR session; and
   transmitting the xR profile to the second HMD for use in calibrating the second HMD for participating in the co-located xR session.

16. The method of claim 15, wherein the signal integrity comprises a signal-to-noise ratio within the first physical environment for each of the transmission mechanisms.

17. The method of claim 16, further comprising:
   normalizing the determined signal-to-noise ratios based on thresholds for use of the respective transmission mechanisms for an xR session within the first physical environment; and
   generating one or more rankings of the normalized signal-to-noise ratios for the transmission mechanisms.

18. The method of claim 17, wherein the xR profile for the first physical environment specifies a ranking of the transmission mechanisms available within the xR session for communicating directly with the first HMD.

19. The method of claim 15, wherein the signal integrity is determined by exchanging signal integrity test messages with devices participating in the xR session.

20. The method of claim 19, wherein the devices comprise a third HMD participating in the xR session.

* * * * *